UNITED STATES PATENT OFFICE.

RALPH W. KING, OF THE DALLES, OREGON, ASSIGNOR TO PACIFIC EVAPORATOR COMPANY, OF PORTLAND, OREGON, A CORPORATION OF OREGON.

METHOD OF PREPARING EVAPORATED APPLES.

1,259,634.

Specification of Letters Patent.

Patented Mar. 19, 1918.

No Drawing.

Application filed June 27, 1916. Serial No. 106,150.

*To all whom it may concern:*

Be it known that I, RALPH W. KING, a citizen of the United States, residing at The Dalles, in the county of Wasco and State of Oregon, have invented new and useful Improvements in Methods of Preparing Evaporated Apples, of which the following is a specification.

This invention relates to the method of preparing evaporated apples and consists in certain improvements therein as will be hereinafter fully described and pointed out in the claims.

In evaporating apples where it is especially desirable to retain the natural quality and color of the apple great difficulty is encountered because of the peculiar qualities of the apple, particularly the quantity of tannic acid contained in this fruit.

I have found that discoloration may be avoided and the fruit evaporated so as to have very nearly a natural quality and color as follows: The apples are peeled and cored and subjected to a salt solution, the salt being preferably ordinary table salt or sodium chlorid, the solution best adapted for the purpose being a three per cent. solution.

The apples are sliced and immediately subjected to a bleaching agent, such as sulfur fumes. If this cannot be immediately accomplished the fruit is again subjected to a salt solution until it is convenient to fume. The fruit is then evaporated by subjecting it to a current of air, preferably below a temperature of 156° Fahrenheit. In this process the discoloration ordinarily found in evaporated apples is entirely avoided.

The quality as to taste is very closely preserved in that the fruit cells are not broken down. It has been a common practice in evaporating apples to subject them to a high temperature to prevent discoloration. In this process this is unnecessary.

What I claim as new is:—

1. The method of preparing evaporated apples which consists in subjecting the same to a three per cent. salt solution; and evaporating the moisture from the apples so treated.

2. The method of preparing evaporated apples which consists in subjecting the same to a common salt solution; then subjecting the same to a bleaching agent; and then evaporating the moisture therefrom.

3. The method of preparing evaporated apples which consists in subjecting the same to a salt solution; slicing the same; subjecting the same to a salt solution; subjecting the same to a bleaching agent; and evaporating the moisture therefrom.

4. The method of preparing evaporated apples which consists in subjecting the same to a salt solution; and evaporating the moisture from the apples so treated at a temperature below 156° Fahrenheit.

5. The method of preparing evaporated apples which consists in subjecting the same to a salt solution; then subjecting the same to a bleaching agent; and then evaporating the moisture therefrom at a temperature below 156° Fahrenheit.

In testimony whereof I have hereunto set my hand.

RALPH W. KING.

Copies of this patent may be obtained for five cents each, by addressing the "Commissioner of Patents, Washington, D. C."